United States Patent
Wang et al.

(10) Patent No.: US 8,422,140 B2
(45) Date of Patent: Apr. 16, 2013

(54) FIXED FOCAL LENGTH LENS

(75) Inventors: Kuo-Chuan Wang, Hsinchu (TW); Ching-Lung Lai, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 228 days.

(21) Appl. No.: 12/871,112

(22) Filed: Aug. 30, 2010

(65) Prior Publication Data

US 2011/0085254 A1   Apr. 14, 2011

(30) Foreign Application Priority Data

Oct. 13, 2009   (TW) ................................ 98134636 A

(51) Int. Cl.
 *G02B 9/00* (2006.01)
 *G02B 9/62* (2006.01)
 *G02B 13/18* (2006.01)
(52) U.S. Cl.
 USPC ............ 359/649; 359/756; 359/761; 359/713
(58) Field of Classification Search .......... 359/754–756, 359/713, 761–762, 749–753, 733, 649–651
 See application file for complete search history.

(56) References Cited

U.S. PATENT DOCUMENTS

| | | | | |
|---|---|---|---|---|
| 3,709,582 A * | 1/1973 | Walker | | 359/733 |
| 5,042,929 A | 8/1991 | Tanaka et al. | | |
| 5,159,496 A * | 10/1992 | Kataoka | | 359/754 |
| 5,550,679 A | 8/1996 | Sugawara | | |
| 5,903,400 A * | 5/1999 | Endo | | 359/758 |
| 6,124,984 A | 9/2000 | Shibayama et al. | | |
| 6,124,987 A | 9/2000 | Kayanuma et al. | | |
| 6,471,359 B1 * | 10/2002 | Kim et al. | | 353/122 |
| 6,556,353 B2 * | 4/2003 | Omura | | 359/649 |
| 6,844,984 B2 | 1/2005 | Benedix et al. | | |
| 7,173,777 B1 | 2/2007 | Lu et al. | | |
| 7,453,651 B2 | 11/2008 | Narikawa et al. | | |
| 7,715,117 B2 * | 5/2010 | Hatada | | 359/749 |
| 7,830,620 B2 * | 11/2010 | Asami | | 359/761 |
| 8,089,708 B2 * | 1/2012 | Yamamoto | | 359/761 |
| 2003/0007138 A1 * | 1/2003 | Shigematsu et al. | | 355/67 |
| 2008/0137212 A1 * | 6/2008 | Kawakami et al. | | 359/649 |
| 2010/0208366 A1 * | 8/2010 | Inoue | | 359/784 |

FOREIGN PATENT DOCUMENTS

TW   M309675   4/2007

* cited by examiner

*Primary Examiner* — Jordan Schwartz
(74) *Attorney, Agent, or Firm* — J.C. Patents

(57) ABSTRACT

A fixed focal length lens including a first lens group, a second lens group, and a third lens group arranged in sequence from a magnified side towards a reduced side is provided. The first lens group has a positive refractive power, and includes a first lens and a second lens arranged in sequence from the magnified side towards the reduced side. Refractive powers of the first lens and the second lens are respectively negative and positive. The second lens group has a positive refractive power, and includes a third lens, a fourth lens, and a fifth lens arranged in sequence from the magnified side towards the reduced side. Refractive powers of the third lens, the fourth lens, and the fifth lens are respectively positive, negative, and positive. The third lens group has a positive refractive power, and includes a sixth lens. A refractive power of the sixth lens is positive.

14 Claims, 5 Drawing Sheets

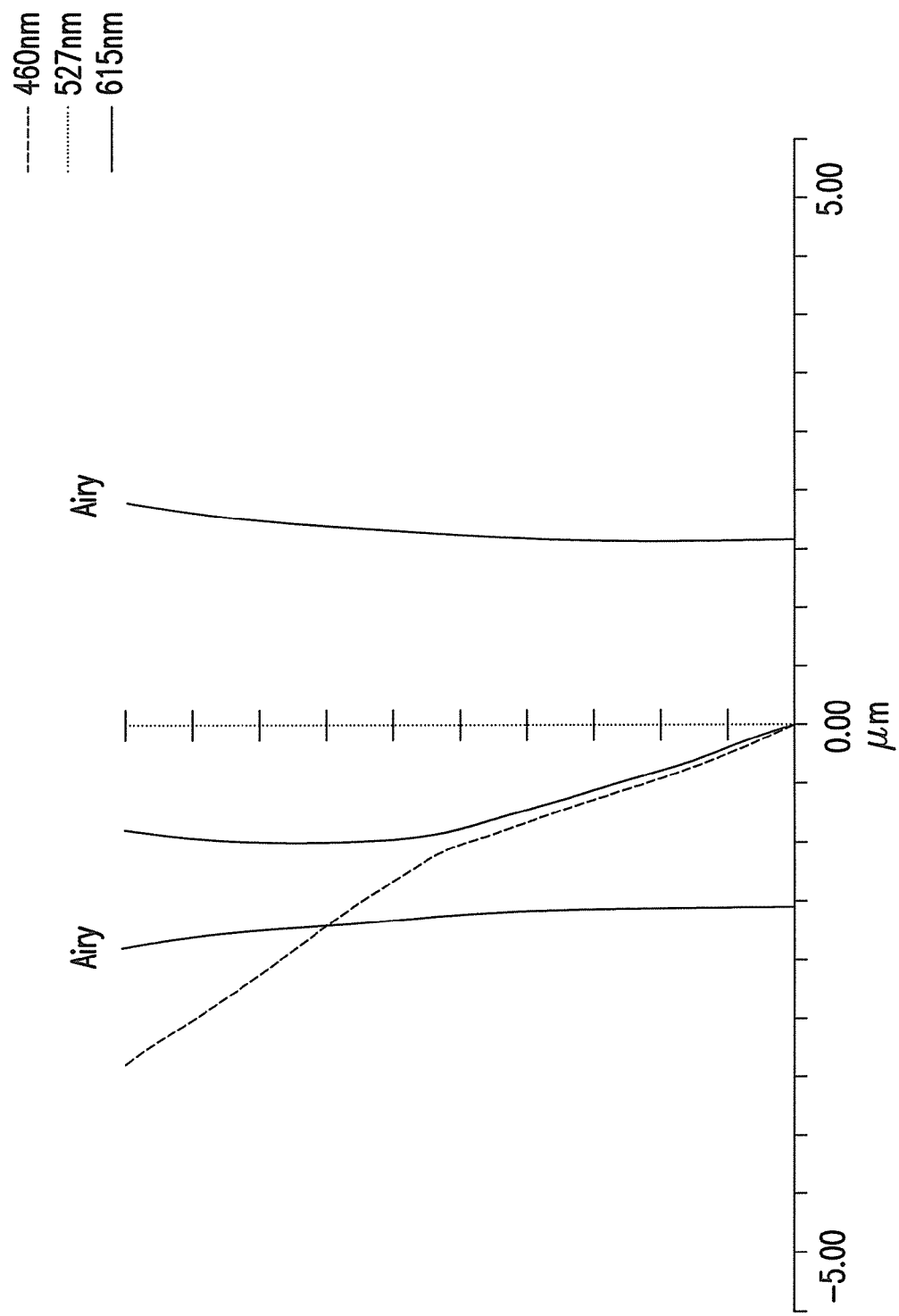

FIXED FOCAL LENGTH LENS

CROSS-REFERENCE TO RELATED APPLICATION

This application claims the priority benefit of Taiwan application serial no. 98134636, filed on Oct. 13, 2009. The entirety of the above-mentioned patent application is hereby incorporated by reference herein and made a part of this specification.

BACKGROUND OF THE INVENTION

1. Field of the Invention

The invention relates to a lens, and more particularly relates to a fixed focal length lens.

2. Description of Related Art

Design of a projection lens is a challenge for an optical lens designer. The projection lens with a good performance may have advantages of high image quality, low distortion aberration, high resolution, high contrast, and uniform image illumination. Moreover, to achieve a function of projecting a large image within a short distance, the projection lens may have a large field of view (FOV) and a relatively low distortion aberration. To increase a light efficiency and the illumination uniformity of a projected image, a maximum angle (i.e. a telecentric angle) of a chief beam at a reduced side of the projection lens relative to an optical axis is designed to be relatively small, so that the chief beam is approximately parallel to the optical axis.

The above design requirements are impeded by each other, so that a design difficulty of the projection lens is increased. For example, when the distortion aberration is reduced as far as possible, the FOV of the projection lens and the number of the lenses used by the projection lens are influenced. If the projection lens is designed to have a large FOV, and the chief beam at the reduced side is approximately parallel to the optical axis, a length and a size of the projection lens are liable to be increased. Moreover, to achieve the advantages of high imaging quality, low distortion aberration, high resolution, high contrast, and uniform image illumination, aspheric lenses are generally used though application of the glass aspheric lenses may increase a cost, so that the cost of the projection lens may not be reduced. If spherical lenses are used for a projection lens merely, the number of the lenses used by the projection lens may be over and above 9, so that the size of the projection lens is increased, and the cost of the projection lens may not be effectively reduced.

U.S. Pat. No. 5,042,929 discloses a lens set having 7 lenses. The lens set includes a front lens group and a back lens group. The front lens group includes 6 lenses, and refractive powers of the lenses from a magnified side towards a reduced side are respectively positive, negative, positive, negative, positive, and positive. A back focal length of the front lens group is longer, and thus a length of the whole lens set is longer as well, which is hard to miniaturize the lens set. The back lens group has only one positive lens, and the positive lens is a plastic aspheric lens. Since the plastic aspheric lens is close to the reduced side, it is difficult to assemble. When the lens set is being focused, the back lens group is fixed, and the front lens group is movable. In other words, a focusing mode of the lens is not an internal focusing type, and an emitting light is liable to be interfered with other mechanical members, so that a shade angle problem of an imaged picture occurs. To resolve such problem, the mechanical members are disposed apart from the lens set as far as possible, so that the size of the whole lens set is increased. In addition, since the number of the glass lenses used by the lens set is 6, a lightweight of the lens may not be achieved, and a cost of the lens set may not be reduced.

U.S. Pat. No. 7,173,777 discloses a lens set having 8 lenses grouped into a first lens group, a second lens group, and a third lens group. The first lens group has a negative refractive power and includes two lenses, wherein at least one of the lenses is a plastic aspheric lens. The second lens group has a negative refractive power and includes one lens. The third lens group has a positive refractive power, and includes five lenses. The number of the glass lenses of the lens set is relatively more, so that a lightweight of the lens set may not be achieved, and a cost of the lens may not be reduced.

Taiwan Patent No. M309675 discloses a zoom lens, wherein the zoom lens includes a first lens set having a negative refractive power, a second lens set having a positive refractive power, and a third lens set having a positive refractive power arranged in sequence from an object side towards an image side. U.S. Pat. No. 6,124,984 discloses a zoom lens, wherein the zoom lens includes a first lens set having a negative refractive power, a second lens set having a positive refractive power, and a third lens set having a positive refractive power. When the zoom lens is zoomed from a wide-end to a tele-end, the first lens set and the second lens set are required to be moved for reducing a distance between the first lens set and the second lens set without increasing a distance between the second lens set and the third lens set, so as to implement a 2.5 zoom ratio performance.

U.S. Pat. No. 6,124,987 discloses a zoom lens including a front lens set having a negative refractive power and a back lens set having a positive refractive power. The first surface of the first lens in the front lens set is an aspheric surface, and the second lens in the back lens set also applies the aspheric design. When the zoom lens is being zoomed, the front and the back lens sets are relatively moved along the optical axis. When the zoom lens is being focused, only the last lens having a positive refractive power in the back lens set is moved. U.S. Pat. No. 7,453,651 discloses a zoom lens including a first lens group having a negative refractive power, a second lens group having a positive refractive power, and a third lens group having a positive refractive power. U.S. Pat. No. 6,844,984 discloses a lens including a first lens group, a second lens group, and a third lens group. The first lens group is used to focus, the second lens group is used control zooming, and the third lens group is fixed. U.S. Pat. No. 5,550,679 discloses a projection lens including a first lens set having a negative refractive power, a second lens set having a positive refractive power, and a third lens group having a positive refractive power.

SUMMARY OF THE INVENTION

The invention is directed to a fixed focal length lens having a good optical imaging quality.

Additional aspects and advantages of the present invention will be set forth in the description of the techniques disclosed in the present invention.

One embodiment of the invention provides a fixed focal length lens adapted to be disposed between a magnified side and a reduced side. The fixed focal length lens includes a first lens group, a second lens group, and a third lens group. The first lens group is disposed between the magnified side and the reduced side, and has a positive refractive power. The first lens group includes a first lens and a second lens arranged in sequence from the magnified side towards the reduced side, and refractive powers of the first lens and the second lens are respectively negative and positive. The second lens group is disposed between the first lens group and the reduced side, and has a positive refractive power. The second lens group includes a third lens, a fourth lens, and a fifth lens arranged in sequence from the magnified side towards the reduced side, and refractive powers of the third lens, the fourth lens, and the fifth lens are respectively positive, negative, and positive. The third lens group is disposed between the second lens group and the reduced side and has a positive refractive power. The third lens group includes a sixth lens and a refractive power of the sixth lens is positive.

In the fixed focal length lens according to the embodiment of the invention, the refractive powers of the first lens group, the second lens group, and the third lens groups are all positive, and the refractive powers of the first to the sixth lenses are sequentially negative, positive, positive, negative, positive, and positive. With such design, the fixed focal length lens may have good imaging quality, a relatively large field of view (FOV), and a relatively small telecentric angle. Moreover, since the number of the lenses used by the fixed focal length lens according to the embodiment of the invention is relatively less, a cost of the fixed focal length lens may be reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 2A-2C are image optical simulation data diagrams of the fixed focal length lens of FIG. 1.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
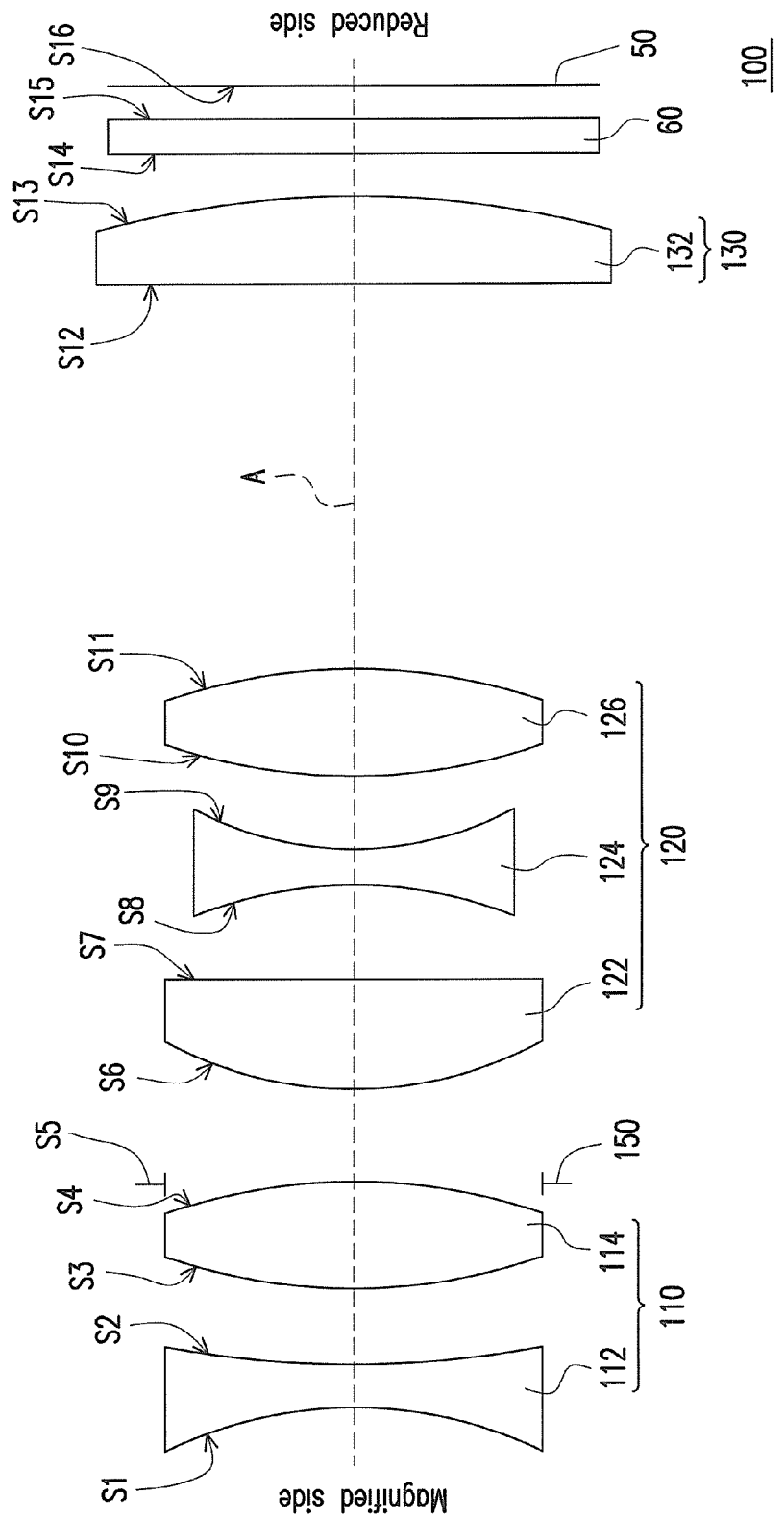
FIG. 1 is a structural schematic diagram of a fixed focal length lens according to an embodiment of the invention.

Referring to FIG. 1, the fixed focal length lens 100 of the embodiment is adapted to be disposed between a magnified side and a reduced side. In the embodiment, the fixed focal length lens 100 is configured in a projection apparatus (not shown) to serve as a projection lens of the projection apparatus. Moreover, the fixed focal length lens 100 is capable of projecting an image generated by an image processing device 50 disposed at the reduced side onto a screen (not shown) disposed at the magnified side. In the embodiment, the image processing device 50 is, for example, a digital micro-mirror device (DMD). However, in other embodiments, the image processing device 50 may be a liquid-crystal-on-silicon panel (LCOS panel), a transmissive liquid crystal panel, other suitable light valve or other suitable spatial light modulators. The fixed focal length lens 100 includes a first lens group 110, a second lens group 120, and a third lens group 130. The first lens group 110 is disposed between the magnified side and the reduced side, and has a positive refractive power. The first lens group 110 includes a first lens 112 and a second lens 114 arranged in sequence from the magnified side towards the reduced side, and refractive powers of the first lens 112 and the second lens 114 are respectively negative and positive. The second lens group 120 is disposed between the first lens group 110 and the reduced side, and has a positive refractive power. The second lens group 120 includes a third lens 122, a fourth lens 124, and a fifth lens 126 arranged in sequence from the magnified side towards the reduced side, and refractive powers of the third lens 122, the fourth lens 124, and the fifth lens 126 are respectively positive, negative, and positive. The third lens group 130 is disposed between the second lens group 120 and the reduced side, and has a positive refractive power. The third lens group 130 includes a sixth lens 132, and a refractive power of the sixth lens 132 is positive.

The first lens 112 and the second lens 114 are, for example, aspheric lenses, and at least two of the third lens 122, the fourth lens 124, and the fifth lens 126 are aspheric lenses. In the embodiment, the fourth lens 124 and the fifth lens 126 are aspheric lenses, and the sixth lens 132 is a spherical lens. Moreover, in the embodiment, the third lens 122 is a spherical lens.

In detail, in the embodiment, the first lens 112 is, for example, a biconcave lens, and the second lens 114 is, for example, a biconvex lens. The third lens 122 is, for example, a plano-convex lens having a convex surface facing to the magnified side, the fourth lens 124 is, for example, a biconcave lens, and the fifth lens 126 is, for example, a biconvex lens. Moreover, the sixth lens 132 is, for example, a plano-convex lens having a plane surface facing the magnified side.

In the embodiment, the fixed focus length lens 100 further includes an aperture stop 150 disposed between the first lens group 110 and the second lens group 120. Moreover, in the embodiment, positions of the first lens group 110 and the third lens group 130 are maintain fixed relative to the fixed focal length lens 100, and the second lens group 120 is capable of being moved relative to the first lens group 110 and the third lens group 130 to focus. In other words, the fixed focal length lens 100 of the embodiment has an internal focusing mode, so that a shade angle problem of an imaged picture is not liable to occur.

To ensure the fixed focal length lens 100 having a good optical imaging quality, the fixed focal length lens 100 may be designed to satisfy at least one of following four conditions:

(1) $2.9<f_{G1}/f<3.1$, where f is an effective focal length of the fixed-focus length lens, and $f_{G1}$ is an effective focal length of the first lens group;

(2) $1<f_{G1}/f_{G2}<2$ and $1.5<f_{G1}/f_{G3}<2.5$, where fG1 is an effective focal length of thew first lens group, fG2 is an effective focal length of the second lens group, and fG3 is an effective focal length of the third lens group;

(3) vL3>vL4 and vL5>vL4, where vL3 is an Abbe number of the third lens, vL4 is an Abbe number of the fourth lens, and vL5 is an Abbe number of the fifth lens; and (4) $v_{L3}>50$, $v_{L4}<30$, and $v_{L5}>50$.

In the fixed focal length lens 100 of the embodiment, the refractive powers of the first lens group 110, the second lens group 120, and the third lens groups 130 are all positive, and the refractive powers of the first lens to the sixth lenses 112, 114, 122, 124, 126, and 132 are sequentially negative, positive, positive, negative, positive, and positive. According to such design and making the fixed focal length lens 100 selectively satisfy at least one of the above four conditions, the fixed focal length lens 100 may have advantages of a small lateral color, a low distortion aberration, a large field of view FOV), a small telecentric angle (for example, within 3 degrees), and a small size. Moreover, since the number of the lenses used by the fixed focal length lens 100 of the embodiment is relatively less, a cost and a whole size of the fixed focal length lens 100 may be reduced. In addition, in the embodiment, the first lens 112, the second lens 114, the fourth lens 124, and the fifth lens 126 are, for example, plastic aspheric lenses, so that the cost and weight of the fixed focal length lens 100 may be further reduced. Moreover, in the embodiment, materials of the third lens 122 and the sixth lens 132 are, for example, glass, and the invention is not limited to glass.

An embodiment of the fixed focus length lens 100 is provided according to the following content. It should be noticed that data listed in the following tables 1 and 2 are not used to limit the invention, and suitable modifications and variations may be made to the parameters or settings of the lists by those skilled in the art after referring to the invention without departing from the scope or spirit of the invention.

In table 1, the space refers to a straight-line distance along an optical axis A of the fixed focal length lens 100 between two adjacent surfaces. For example, a space of the surface Si refers to a straight-line distance along the optical axis A between the surfaces Si and S2. The corresponding thickness, refractive index, and Abbe number of each of the lenses in the remark column may refer to the corresponding values of the space, the refractive index, and the Abbe number in the same row. Moreover, in table 1, the surfaces S1 and S2 are two surfaces of the first lens 112, and the surfaces S3 and S4 are two surfaces of the second lens 114. The surface S5 is the aperture stop 150. The surfaces S6 and S7 are two surfaces of the third lens 122, the surfaces S8 and S9 are two surfaces of the fourth lens 124, the surfaces S10 and Sll are two surfaces of the fifth lens 126, and the surfaces S12 and S13 are two surfaces of the sixth lens 132. The surfaces S14 and S15 are two surfaces of a cover glass 60 protecting the image processing device 50. Moreover, the surface S16 is an active surface (i.e. an object plane) of the image processing device 50. The parameters such as the radius of curvatures and the spaces of the surfaces are shown in the table 1, and detailed descriptions of the parameters are not mentioned again. In the embodiment, the effective focal length of the fixed focal length lens 100 is 14.7531 mm, the FOV is 37.35degrees, and the telecentric angle is 1.64 degrees.

The surfaces S1, S2, S3, S4, S8, S9, S10 and S11 are aspheric surfaces, and may be represented by a following equation:

$$Z = \frac{cr^2}{1 + \sqrt{1 - (1+k)c^2 r^2}} + A_2 r^2 + A_4 r^4 + A_6 r^6 + A_8 r^8 + \ldots$$

Where, Z represents a sag along a direction of the optical axis A, and c represents a reciprocal of a radius of an osculating sphere, i.e. a reciprocal of a radius of curvature (for example, the radius of curvature of the surfaces S1 and S2 in table 1) of a place closed to the optical axis A. k is a conic coefficient, r is a height of the aspheric surface, i.e. a height from a center of the lens to an edge of the lens, and $A_2, A_4, A_6, A_8 \ldots$ are aspheric coefficients, and in the embodiment, the aspheric coefficient $A_2$ is 0. In the following table 2, the aspheric parameters of the surfaces S1, S2, S3, S4, S8, S9, S10 and S11 are listed.

TABLE 1

| Surface | Radius of curvature (mm) | Space (mm) | Refractive index | Abbe number | Remark |
|---|---|---|---|---|---|
| S1 | −5.86391 | 1.025252 | 1.631919 | 23.416119 | First lens |
| S2 | −689.257 | 1.492788 | | | |
| S3 | 11.19915 | 2.086614 | 1.631919 | 23.416119 | Second lens |
| S4 | −13.5853 | 0.1 | | | |
| S5 | Infinity | 1.934463 | | | Aperture stop |
| S6 | 7.998142 | 2.300996 | 1.696797 | 55.532241 | Third lens |
| S7 | Infinity | 1.977376 | | | |
| S8 | −5.60998 | 0.802241 | 1.631919 | 23.416119 | Fourth lens |
| S9 | 7.924034 | 1.457995 | | | |
| S10 | 9.019158 | 2.25586 | 1.53116 | 56.043828 | Fifth lens |
| S11 | −10.7965 | 9.522959 | | | |
| S12 | Infinity | 1.810764 | 1.834 | 37.160487 | Sixth lens |
| S13 | −20 | 0.93 | | | |
| S14 | Infinity | 0.7 | 1.5168 | 64.167336 | Cover glass |
| S15 | Infinity | 0.71 | | | |
| S16 | Infinity | 0 | | | Image processing device surface |

TABLE 2

| Aspheric parameter | Conic coefficient k | Coefficient $A_4$ | Coefficient $A_6$ | Coefficient $A_8$ |
|---|---|---|---|---|
| S1 | 0 | 0.0040530913 | −0.00015920095 | 4.7280986e−6 |
| S2 | 0 | 0.002061639 | −4.5013781e−5 | −1.2663751e−6 |
| S3 | 0 | −0.00099806925 | 6.2560531e−5 | −1.6276408e−6 |
| S4 | 0 | −6.0172442e−5 | 2.4011426e−6 | 1.0402148e−6 |
| S8 | 0 | 0.0041672569 | −0.0001460624 | 4.8944417e−6 |
| S9 | 0 | 0.00013244566 | 8.0055984e−5 | −5.3911115e−6 |
| S10 | 0 | −0.0020141598 | 8.4342348e−5 | −1.3507511e−6 |
| S11 | 0 | 0.00039434018 | −1.8953493e−5 | 1.531376e−6 |

Figure 2A:
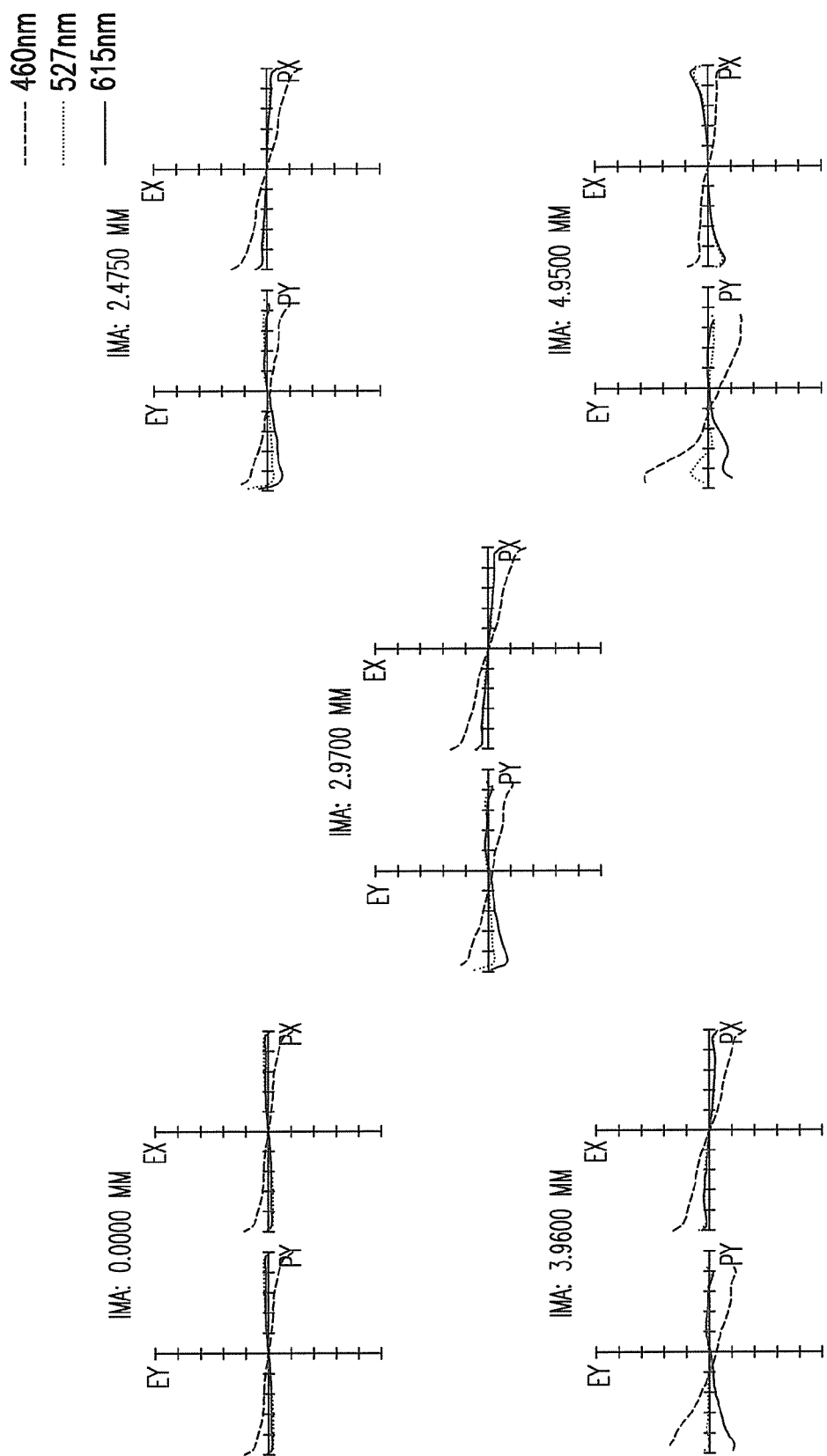
Figure 2B:
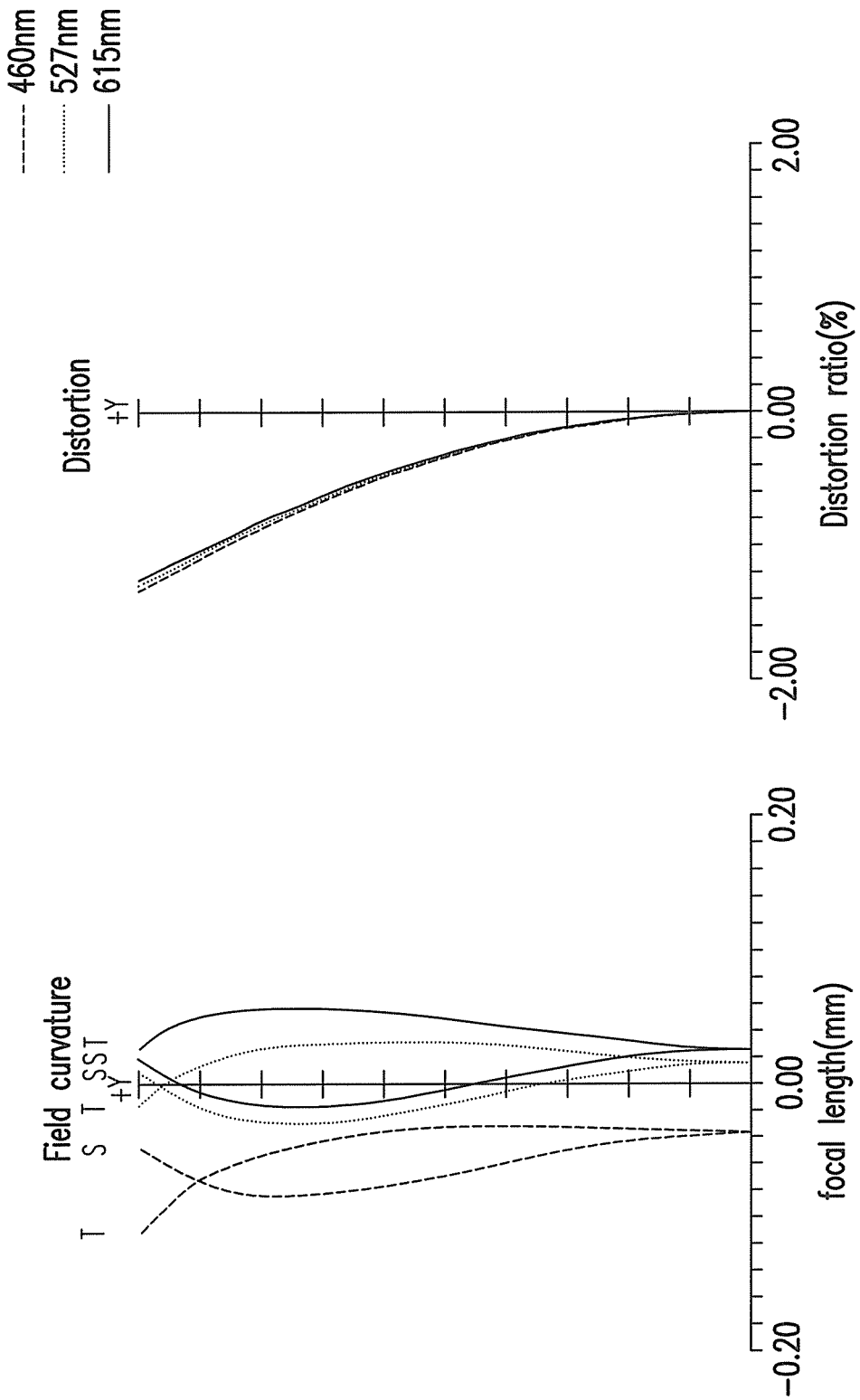

Referring to FIGS. 2A-2C, FIG. 2A is a transverse ray fan plot of an image, and is a simulation data diagram formed base on lights having wavelengths of 460 nm, 527 nm and 615 nm, wherein the horizontal coordinates and the longitudinal coordinates are each from 50 μm to +50 μm. FIG. 2B is a simulation data diagram formed base on lights having wavelengths of 460 nm, 527 nm and 615 nm The figures in FIG. 2B are sequentially a field curvature diagram and distortion diagram from the left to the right, and image heights Y of the longitudinal coordinates are changed to field angles, wherein a maximum field angle is 18.868 degrees. FIG. 2C is a lateral color diagram, and is a simulation data diagram formed base on lights having wavelengths of 460 nm, 527 nm and 615 nm, wherein a maximum field of the longitudinal coordinates is 4.95 mm The figures shown in FIGS. 2A-2C are all within a standard range, so that the figures confirm that the fixed focal length lens 100 of the embodiment may truly have the good optical imaging quality.

Figure 3:
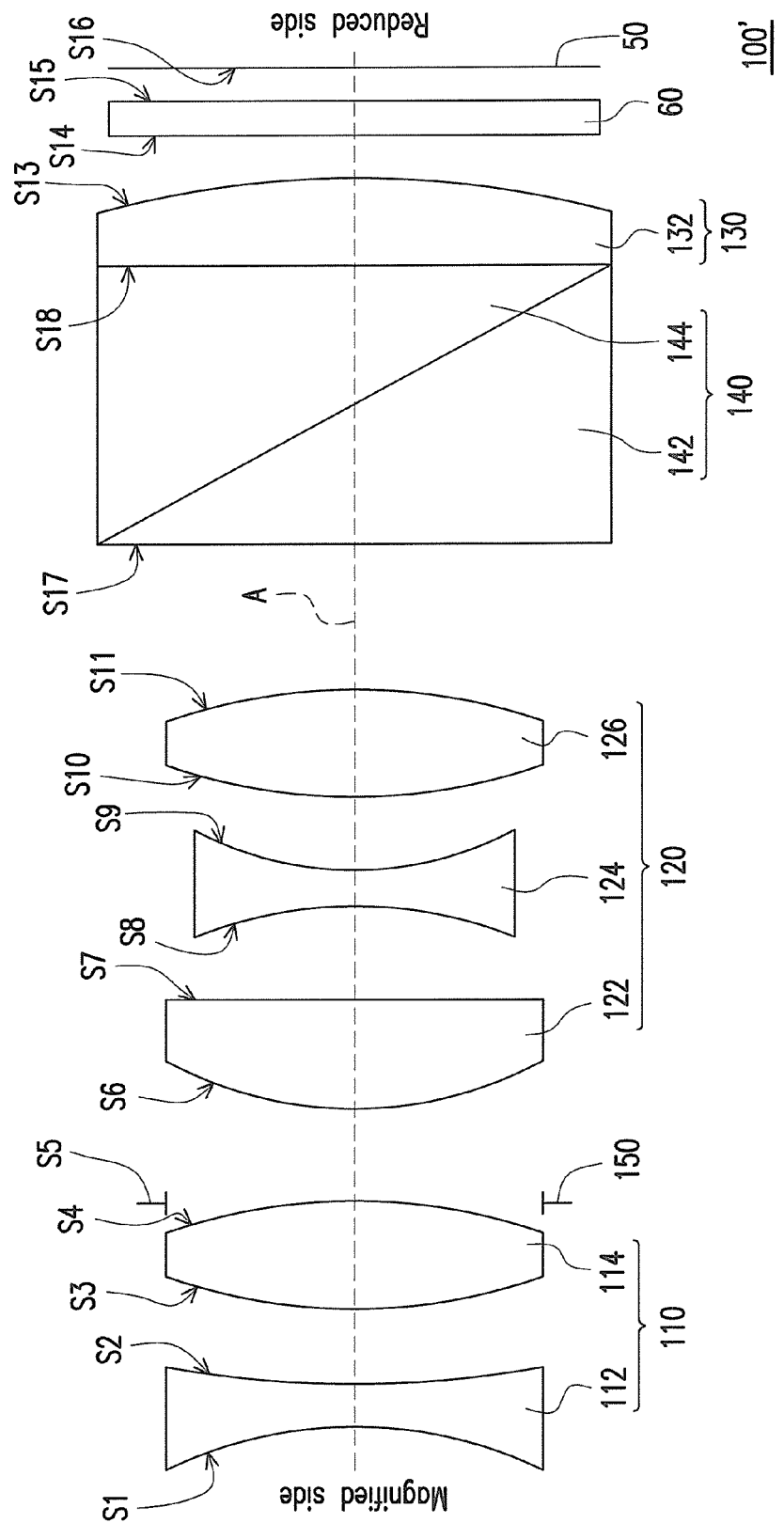
FIG. 3 is a structural schematic diagram of a fixed focal length lens according to another embodiment of the invention.

Referring to FIG. 3, the fixed focal length lens 100' of the embodiment is similar to the fixed focal length lens 100 of FIG. 1, and a major difference therebetween is that the fixed focus fixed focal length lens 100' of the embodiment further includes an total internal reflection prism 140 disposed between the second lens group 120 and the third lens group 130. In the embodiment, the sixth lens 132 is cemented with the total internal reflection prism 140. Moreover, in the embodiment, the total internal reflection prism 140 includes a first prism 142 and a second prism 144 leaned against each other. In the embodiment, an air gap G exists between the first prism 142 and the second prism 144, so as to form a total internal reflection surface. In the fixed focal length lens 100', since the sixth lens 132 is integrated with the total internal reflection prism 140, the sixth lens 132 serving as a field lens is simultaneously disposed in transmission paths of an illumination beam sent from an illumination system of the projection apparatus and an image beam provided by the image processing device 50, so that the size of the projection apparatus using the fixed focal length lens 100' may be reduced.

The fixed focal length lens 100' of the embodiment has similar advantages and functions of the fixed focal length lens 100, so that detailed descriptions are not mentioned again. An embodiment of the fixed focal length lens 100' is provided according to a following table 3, and the invention is not limited thereto.

TABLE 3

| Surface | Radius of curvature (mm) | Space (mm) | Refractive index | Abbe number | Remark |
|---|---|---|---|---|---|
| S1 | −5.86391 | 1.025252 | 1.631919 | 23.416119 | First lens |
| S2 | −689.257 | 1.492788 | | | |
| S3 | 11.19915 | 2.086614 | 1.631919 | 23.416119 | Second lens |
| S4 | −13.5853 | 0.1 | | | |
| S5 | Infinity | 1.934463 | | | Aperture stop |
| S6 | 7.998142 | 2.300996 | 1.696797 | 55.532241 | Third lens |
| S7 | Infinity | 1.977376 | | | |
| S8 | −5.60998 | 0.802241 | 1.631919 | 23.416119 | Fourth lens |
| S9 | 7.924034 | 1.457995 | | | |
| S10 | 9.019158 | 2.25586 | 1.53116 | 56.043828 | Fifth lens |
| S11 | −10.7965 | 4.669186 | | | |
| S17 | Infinity | 7.11 | 1.5168 | 64.167336 | Total internal reflection prism |
| S18 | Infinity | 1.810764 | 1.834 | 37.160487 | Sixth lens |
| S13 | −20 | 0.93 | | | |
| S14 | Infinity | 0.7 | 1.5168 | 64.167336 | Cover glass |
| S15 | Infinity | 0.71 | | | |
| S16 | Infinity | 0 | | | Image processing device surface |

In table 3, the surfaces Sl-S11 and S13-S16 are similar to the surfaces Sl-S11 and S13-S16 of the table 1, and therefore detailed descriptions are not repeated. Moreover, the surface S17 is a surface of the total internal reflection prism 140 facing the magnified side, and the surface S18 is a connection surface between the total internal reflection prism 140 and the sixth lens 132. In the embodiment, an effective focal length of the fixed focal length lens 100' is 14.6528 mm, an FOV is 37.74 degrees, and a telecentric angle is 1.84degrees.

The aspheric parameters of the surfaces S1, S2, S3, S4, S8, S9, S10, and S11 are the same as the aspheric parameters of the surfaces 51, S2, S3, S4, S8, S9, S10, and S11 of FIG. 1 and the table 2, and the detailed parameters of the surfaces S1, S2, S3, S4, S8, S9, S10, and S11 are shown in the table 2, so that detailed descriptions thereof are not repeated.

In summary, the embodiment or the embodiments of the invention may have at least one of the following advantages. In the fixed focal length lens according to the embodiments of the invention, the refractive powers of the first, the second, and the third lens groups are all positive, and the refractive powers of the first to the sixth lenses are sequentially negative, positive, positive, negative, positive, and positive. According to such design, focus fixed focal length lens may have a good image quality, a relatively large FOV, and a relatively small telecentric angle. Moreover, since the number of the lenses used by the fixed focal length lens of the invention is relatively less, a cost thereof may be reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed focal length lens, adapted to be disposed between a magnified side and a reduced side, the fixed focal length lens comprising:
    a first lens group, disposed between the magnified side and the reduced side and having a positive refractive power, wherein the first lens group comprises a first lens and a second lens arranged in sequence from the magnified side towards the reduced side, and refractive powers of the first lens and the second lens are respectively negative and positive;
    a second lens group, movably disposed between the first lens group and the reduced side for focusing and having a positive refractive power, wherein the second lens group comprises a third lens, a fourth lens, and a fifth lens arranged in sequence from the magnified side towards the reduced side, and refractive powers of the third lens, the fourth lens, and the fifth lens are respectively positive, negative, and positive; and
    a third lens group, disposed between the second lens group and the reduced side and having a positive refractive power, wherein the third lens group comprises a sixth lens, and a refractive power of the sixth lens is positive,
    wherein positions of the lens group and the third lens group are maintained fixed relative to the fixed focal length lens, and the second lens group is moved relative to the first lens group and the third lens group to focus, and the fixed focal length lens projects an image from the reduced side to the magnified side.

2. The fixed focal length lens as claimed in claim 1, wherein each of the first lens and the second lens is an aspheric lens, and at least two of the third lens, the fourth lens and the fifth lens are aspheric lenses.

3. The fixed focal length lens as claimed in claim 2, wherein each of the fourth lens and the fifth lens is an aspheric lens, and the sixth lens is a spherical lens.

4. The fixed focal length lens as claimed in claim 3, wherein the third lens is a spherical lens.

5. The fixed focal length lens as claimed in claim 1, further comprising an aperture stop disposed between the first lens group and the second lens group.

6. The fixed focal length lens as claimed in claim 1, further comprising a total internal reflection prism disposed between the second lens group and the third lens group.

7. The fixed focal length lens as claimed in claim 6, wherein the sixth lens and the total internal reflection prism are cemented together.

8. The fixed focal length lens as claimed in claim 1, wherein the fixed focal length lens satisfies a condition of $2.9<f_{G1}/f<3.1$, where f is an effective focal length of the fixed focal length lens, and $f_{G1}$ is an effective focal length of the first lens group.

9. The fixed focal length lens as claimed in claim 1, wherein the fixed focal length lens satisfies conditions of $1<f_{G1}/f_{G2}<2$ and $1.5<f_{G1}/f_{G3}<2.5$, where $f_{G1}$ is an effective focal length of the first lens group, $f_{G2}$ is an effective focal length of the second lens group, and $f_{G3}$ is an effective focal length of the third lens group.

10. The fixed focal length lens as claimed in claim 1, wherein the fixed focal length lens satisfies conditions of $v_{L3}>v_{L4}$ and $v_{L5}>v_{L4}$, where $v_{L3}$ is an Abbe number of the third lens, $v_{L4}$ is an Abbe number of the fourth lens, and $v_{L5}$ is an Abbe number of the fifth lens.

11. The fixed focal length lens as claimed in claim 10, wherein the fixed focal length lens satisfies conditions of $v_{L3}>50$, $v_{L4}<30$ and $v_{L5}>50$.

12. The fixed focal length lens as claimed in claim 1, wherein the first lens is a biconcave lens, and the second lens is a biconvex lens.

13. The fixed focal length lens as claimed in claim 1, wherein the third lens is a plano-convex lens having a convex surface facing the magnified side, the fourth lens is a biconcave lens, and the fifth lens is a biconvex lens.

14. The fixed focal length lens as claimed in claim 1, wherein the sixth lens is a plano-convex lens having a plane surface facing the magnified side.

* * * * *